Oct. 8, 1957 J. E. ARCHER 2,809,346
APPARATUS FOR MEASURING THE THICKNESS
OF ELECTROCONDUCTIVE FILMS
Filed Sept. 17, 1953

INVENTOR.
JAMES E. ARCHER
BY
Oscar L. Spencer
ATTORNEY

United States Patent Office 2,809,346
Patented Oct. 8, 1957

2,809,346

APPARATUS FOR MEASURING THE THICKNESS OF ELECTROCONDUCTIVE FILMS

James E. Archer, Tarentum, Pa., assignor to Pittsburgh Plate Glass Company, Allegheny County, Pa., a corporation of Pennsylvania Application September 17, 1953, Serial No. 380,793

2 Claims. (Cl. 324—40)

This invention relates to a novel method and apparatus for measuring the thickness of electrically conducting films on a non-conducting base, and has special utility in the glass industry in the measurement of the thickness of a metallic backing on a glass mirror.

The most common currently used methods for determining the thickness of thin layers of conducting materials placed on a non-conducting base involve either measuring light transmission or counting interference fringes. It is not possible with either of these methods to measure the thickness of, say, a metal film on a dielectric backing if the exposed side of the metal is covered with a coat of paint or some other opaque protective coating, as is frequently the case. In practical applications for routine use, the time required for measurement is longer than is desirable.

When metallic films are deposited by chemical methods it is extremely rare when there are not quite a few pinholes as well as other very small but very numerous inhomogeneities in the films. When the method of correlating light transmission with film thickness is used, these inhomogeneities lead to very low accuracy of measurement, since two films of the same size and thickness but one of them having 1% of its area transparent because of pinholes will provide different thickness indications with optical thickness instruments.

For example, if the films have an optical density of three, this means that the film without pinholes lets through 0.1% of the light incident upon it. However, the pinholes alone, neglecting diffraction effects, let through ten times this much light. For a perfect film, the thickness is proportional to the logarithm of the light transmission. Hence, the actual thickness is half again as much as the calculated thickness when the pinholes are present. When using the method described in this application, a film having 1% pinholes gives an indication that is off by 1% in contrast to the corresponding 50% error when using an optical method. The thickness actually measured by the method and apparatus comprising the present invention is termed the electrical thickness.

The film thickness gauge which is the subject of this invention measures an impedance component of a conducting film which is related directly with thickness. It is unnecessary for the measuring equipment to contact the film. The "probe" that reaches out to measure the film resistance is an oscillating magnetic field. The film modifies this field to a degree dependent upon the magnitude of the impedance of the film and sends the modified magnetic field back to the coil that the field originally came from. This coil receives the modified field and then acts as if its own impedance were changed. This impedance change is measured and indicated by a meter. The meter reading is calibrated in terms of film thickness.

The method is applicable in the case of any conducting material deposited on a non-conducting base. It has been used for both metallic conducting films and films of non-metallic semi-conductors.

Accordingly, it is an object of the present invention to provide a novel method of measuring the electrical thickness of a conducting film wherein the results obtained are not substantially affected by pinholes in the film.

Another object of the present invention is to provide apparatus for measuring the thickness of an electroconductive film utilizing a high frequency electromagnetic field which is altered by the presence of the film to produce an apparent change in an impedance component of a circuit element, this apparent change being related to the thickness of the film.

These and other objects of the present invention will be better understood after studying the following description of a typical embodiment of the present invention in conjunction with the accompanying drawings.

Figure 1:
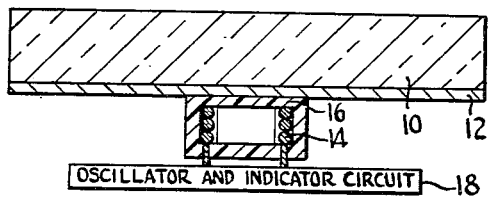
Figure 1 represents a partial schematic and partial cross-sectional view of a device used in accordance with the present invention.

Referring to the drawings, in Fig. 1, 10 represents a non-conductive material such as glass having a coating 12 of an electroconductive material such as silver thereon. A coil 14 whose axis is perpendicular to the surface of the film 12 is spaced a short distance from the surface by means of a suitable spacing means 16 of non-conductive material such as polyethylene. The polyethylene may also serve as a protective casing for the coil. The coil 14 is electrically connected to an oscillator and indicator circuit 18.

Figure 2:
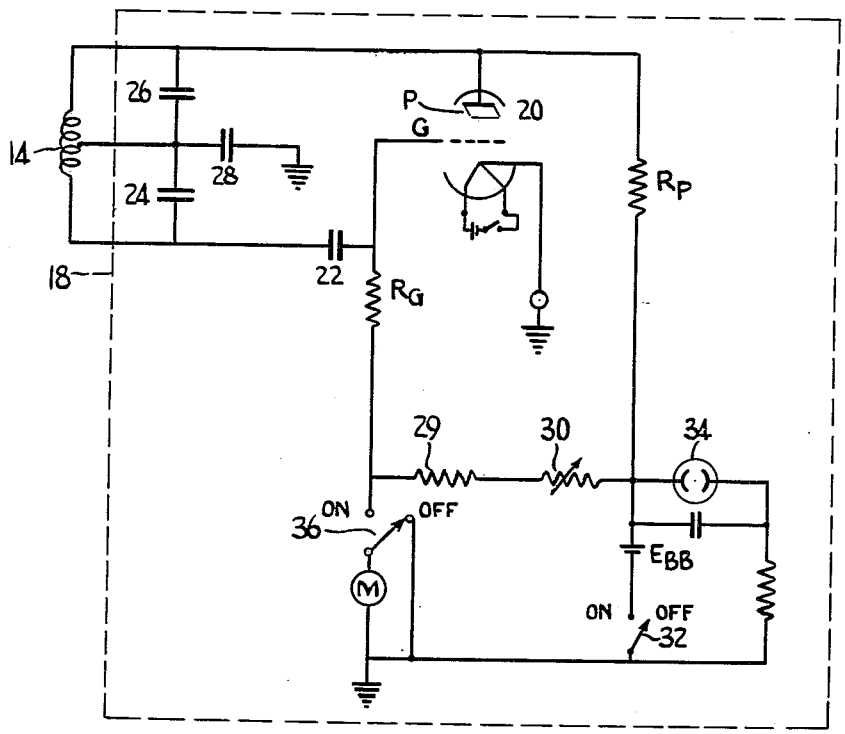
Figure 2 is a schematic circuit diagram of a typical electronic circuit used in conjunction with the present invention.

Referring to Figure 2, coil 14 is shown coupled to a typical embodiment of an oscillator and indicator circuit 18. The inductance coil 14 is coupled to a vacuum tube 20, having one end connected to the plate P and the other end coupled to control grid G via coupling capacitor 22. Capacitors 24 and 26 are series connected in parallel with inductance coil 14. The inductance 14 is also centrally grounded via a grounding capacitor 28. The parameters of the inductance 14 and the capacitances 24 and 26 are so chosen that a tank circuit having a Q of 10 at an operating frequency of 500,000 cycles per second is formed.

Plate supply $E_{BB}$ supplies the plate potential through a plate circuit containing a resistance $R_P$. $E_{BB}$ is also used to provide a grid potential to the grid G of oscillator tube 20 via fixed resistance $R_G$ and 29 and variable resistance 30. A switch 32 is provided to control the application of potential to the oscillator tube 20. A circuit comprising a neon tube 34 is provided to indicate that electrical energy is being supplied to the oscillator and also to provide a visual indication when the voltage supplied by $E_{BB}$ is low. Another switch 36 controls the flow of oscillator grid current through a meter M.

Operation of the device depends upon the change of impedance in the impedance coil 14 when an electrical conductor is disposed so that the magnetic field from the coil cuts across the conductor. The change in impedance has both a resistive and an inductive component, although in the preferred embodiment only the resistive component is utilized. This coil forms the inductive part of the resonant tank circuit 14, 24, 26 for the radio frequency oscillator circuit which includes the oscillator tube 20. This oscillator is sensitive to changes in the effective resistance of the coil 14.

An increase in effective coil resistance results when the metal film 12 is introduced into the oscillating magnetic field emanating from coil 14, decreasing the flow of current to the oscillator control grid and, hence, decreasing the magnitude of the control grid voltage. It is essentially this voltage change which is used as an indicator of film thickness.

In order to have an indicating meter reading that is zero when no film is present, a "bucking" arrangement is used in the meter circuit. The bucking voltage is adjustable by regulation of variable resistor 30 so that account may be taken of slight variations in tube characteristics and supply voltage.

Of prime importance in the design of the gauge are the selections of both an operating frequency and a test coil. It can be shown that for the arrangement of Figure 2, the change in effective coil resistance and effective coil inductance relative to their values where the conducting sheet is absent are to a reasonable approximation given by the following formulas:

(1) $$r = \frac{1.35 N^2 10^{-5} (1/ST)^{-3.6D/A}}{1+(74.1/ATsf)^2}$$

(2) $$l = \frac{(28.6 A N^2 10^{-9})^{-3.6D/A}}{1+(74.1/ATsf)}$$

where $r$ is the change in the effective coil resistance in ohms,
$l$ is the change in the effective coil inductance in henries,
$N$ is the number of coil turns,
$D$ is the distance from the coil center to the conducting sheet in centimeters,
$A$ is the mean coil radius in centimeters,
$s$ is the specific conductivity of the material with respect to silver,
$T$ is the thickness of the conducting film in centimeters,
$f$ is the operating frequency.

These formulas are approximately true if:

(1) The film area is greater than $8A^2$, and
(2) $0.15A$ is less than $D$, which, in turn, is less than $0.9A$, and
(3) The thickness and length of the coil are less than the mean coil radius, and
(4) $T$ is less than $0.2A$.

Figure 3:
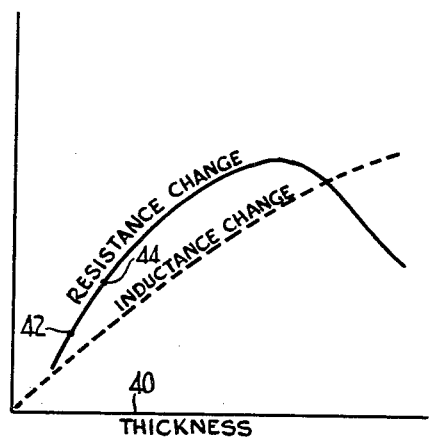
Figure 3 is a typical curve showing how the resistance and inductance of a coil used as a sensing element vary with the thickness of a film sample measured.

In order to better establish the nature of these changes, Equations 1 and 2 are plotted in Figure 3. It is seen that the resistance change as a function of thickness has a maximum value, of which more will be said later. The change in coil resistance is the quantity chosen to be correlated with thickness because the equipment required for measuring changes in coil resistance is relatively simple compared with that required for inductance changes.

It is seen from Figure 3 that a given resistance change can result from two possible thicknesses and therefore the design must be such that no ambiguity of readings will result from this inherent property of the resistance change. There are five possible ways to eliminate the ambiguity, viz: (1) get a rough measure of inductance change along with resistance change, since the inductance change increases monotonically with thickness, approaching a large value asymptotically at large thicknesses, (2) measure the signal amplitude that penetrates to the other side of the film by placing a pickup coil there, (3) measure a given film at more than one frequency, (4) measure the desired film and then put next to it a thin additional film, or (5) choose the operating frequency so that all thicknesses to be measured fall on one side of the resistance maximum. The last method was chosen for use in this case because of its simplicity.

It is desirable to maintain precision through the range of film thicknesses, which means that the rate of change of resistance with respect to thickness must be kept as high as practicable. It is also desirable to have the response of the thickness indicator linear. As seen in Figure 3 and from Equation 1 both of these goals are approached by decreasing the frequency so that the instrument is not at any time operating too near the maximum resistance region. On the other hand, if the frequency becomes too small, the magnitude of the change of resistance will be so small that the response will tend to become lost in the noise level of the equipment. A frequency value of 500,000 cycles per second was found to be a good compromise for measuring the thickness of silver films on mirrors.

Referring to Figure 3, the frequency and coil dimensions selected for a device to measure film thicknesses depicted at 40 should be such that the curve of resistance versus thickness is linear between points 42 and 44 of the curve, which correspond to the minimum and maximum thicknesses to be measured.

The change in inductance that accompanies a change in resistance of the test coil is relatively small if the coil is not too near the conducting film. Even when the operating distance is chosen quite small there is no difficulty in calibrating the instrument and maintaining calibration. The change in inductance results in a shift in oscillator frequency, in the case of the apparatus described herein, which just modifies the value of the resistance change from that which would be observed if the frequency had remained constant. As long as there is a correspondence between indicator reading and film thickness it is of little significance whether the frequency change results in a real indication different from some hypothetical one.

It has been determined that the optimum distance between the induction coil 14 and the film 12 should be between 0.5% and 10% and, preferably approximately 1% of the coil diameter. At such a separation, the magnetic field change due to the presence of the film is strong enough to provide an indication of change in resistance that cannot be confused with the background noise and yet, the coil and the metal film are still separated sufficiently to preclude straight conduction therebetween.

A 500,000 cycle oscillator circuit in actual operation utilizing the principles of the present invention comprises a type 354 pentode utilized as the triode 20 with the plate supply applied to the screen grid, and is provided with 100 micro-microfarad capacitors at 22, 24, 26 and 28. $R_G$ and $R_P$ are each 10,000 ohms, resistance 29 is 60,000 ohms, variable resistance 30 has a maximum value of 7,500 ohms and the resistance in the circuit including switch 32 is 10 megohms. This system is being used to measure film thicknesses ranging from Angstroms to microns.

The inductance change may itself be used as an indication of film thickness. However, the resistance change method is preferable despite the fact that equipment based upon an inductance change has the advantage of monotonic indication, whereas the resistance change type of equipment may provide a double valued indication, as has already been discussed. The preference for a thickness measuring system utilizing resistance change over one utilizing inductance change is due to the necessity of a complicated system for measuring inductance change in the frequency range that must be used for thin films compared to the relatively simple load-sensitive oscillator system which can be used to measure a resistance change.

The inductance change method has been used as a film thickness indicator as follows. One system measured the change in resonant frequency of a tuned circuit, the coil serving as the inductive part of the circuit. A variable condenser calibrated in thickness units and placed in parallel with the coil was adjustable to bring the resonant circuit back to its original frequency after the film was placed in position near the coil. A second system utilized a radio frequency bridge having a variable inductance calibrated in units of thickness and adjustable balance the bridge. Although these systems were completely effective and reliable they involved more equipment than the relatively simple system evolved for indicating film thickness by the resistance change method and involved elaborate adjustments to bring the system into equilibrium.

Measurement of the penetration of the field from an energized coil through a conducting film is another way to obtain the thickness of the film. Two coils were placed coaxially on opposite sides of the film to be measured. A known current was sent through one coil, the exciter, and the voltage induced in the other coil, the pickup, was measured. Here again, the calibration of the equipment was straight forward and the indications were quite reliable. However, the accuracy of this type of system depends upon the uniformity of thickness of the backing for the film as well as the maintenance of uniformity of the spacing between the exciter coil and pickup coil, the location of a capacitive element relative to the equipment, i. e., the hand or body of an operator, and the elaborate sensing equipment required to determine the low voltages induced in the pick-up coil.

While a typical embodiment of my present invention has been described, it is understood that such an embodiment is illustrative only and that by varying the coil diameter and the frequency of the energy that it is possible to measure films having thicknesses on the order of a millimeter, taking into account that a portion of the inductance required for the tank circuit may be provided away from the coil used as a probe. In addition, while the use of the typical embodiment described has been limited to the measurement of the thickness of metallic backings for mirrors, it is understood that the thickness of any electroconductive coating, whether transparent or opaque, on a non-conductive body may be measured by following the teachings of the present invention. Articles within the category of items susceptible of measurement include transparent electroconductive coatings on viewing panels, metallic coatings utilized as resistance elements over ceramic bases in room heaters, electrical insulators provided with electroconductive coatings for protection against corona discharge, for example.

What is claimed is:

1. Apparatus for measuring the thickness of thin electroconductive films comprising an oscillator circuit, a coil in said oscillator circuit for generating an oscillating magnetic field the coil dimensions and operating frequency of the apparatus being determined from the formula $$r = \frac{1.35 N^2 10^{-5} (1/sT)^{-3.6D/A}}{1 + (74.1/ATsf)^2}$$

where $r$ is the change in effective coil resistance in ohms per unit thickness of film, $N$ is the number of coil turns, $D$ is the distance from the coil center to the conducting sheet in centimeters, $A$ is the mean coil radius in centimeters, $T$ is the thickness of the conducting film in centimeters, $s$ is the specific conductivity of the material with respect to silver, $f$ is the operating frequency and $r$ varies approximately linearly, and means for indicating the thickness of the film sample as a function of the apparent change of alternating current resistance of the coil resulting from the change in magnetic field caused by the presence of the measured film, said indicating means being electrically coupled to said coil.

2. Apparatus for measuring the thickness of thin electroconductive films comprising an oscillator circuit, a coil in said oscillator circuit for generating an oscillating magnetic field, means for spacing said coil from said film a distance between about 0.5% and 10% of the mean coil radius of said coil, the coil dimensions and operating frequency of the apparatus being determined from the formula $$r = \frac{1.35 N^2 10^{-5} (1/sT)^{-3.6D/A}}{1 + (74.1/ATsf)^2}$$

where $r$ is the change in effective coil resistance in ohms per unit thickness of film, $N$ is the number of coil turns, $D$ is the distance from the coil center to the conducting sheet in centimeters, $A$ is the mean coil radius in centimeters, $T$ is the thickness of the conducting film in centimeters, $s$ is the specific conductivity of the material with respect to silver, $f$ is the operating frequency and $r$ varies approximately linearly, and means for indicating the thickness of the film sample as a function of the apparent change of alternating current resistance of the coil resulting fromt the change in magnetic field caused by the presence of the measured film, said indicating means being electrically coupled to said coil.

References Cited in the file of this patent

UNITED STATES PATENTS

| | | |
|---|---|---|
| 1,943,619 | Mudge et al. | Jan. 16, 1934 |
| 2,048,591 | Berry | July 21, 1936 |
| 2,217,843 | Langer | Oct. 15, 1940 |
| 2,630,780 | Falck | Mar. 10, 1953 |